Patented Feb. 17, 1953

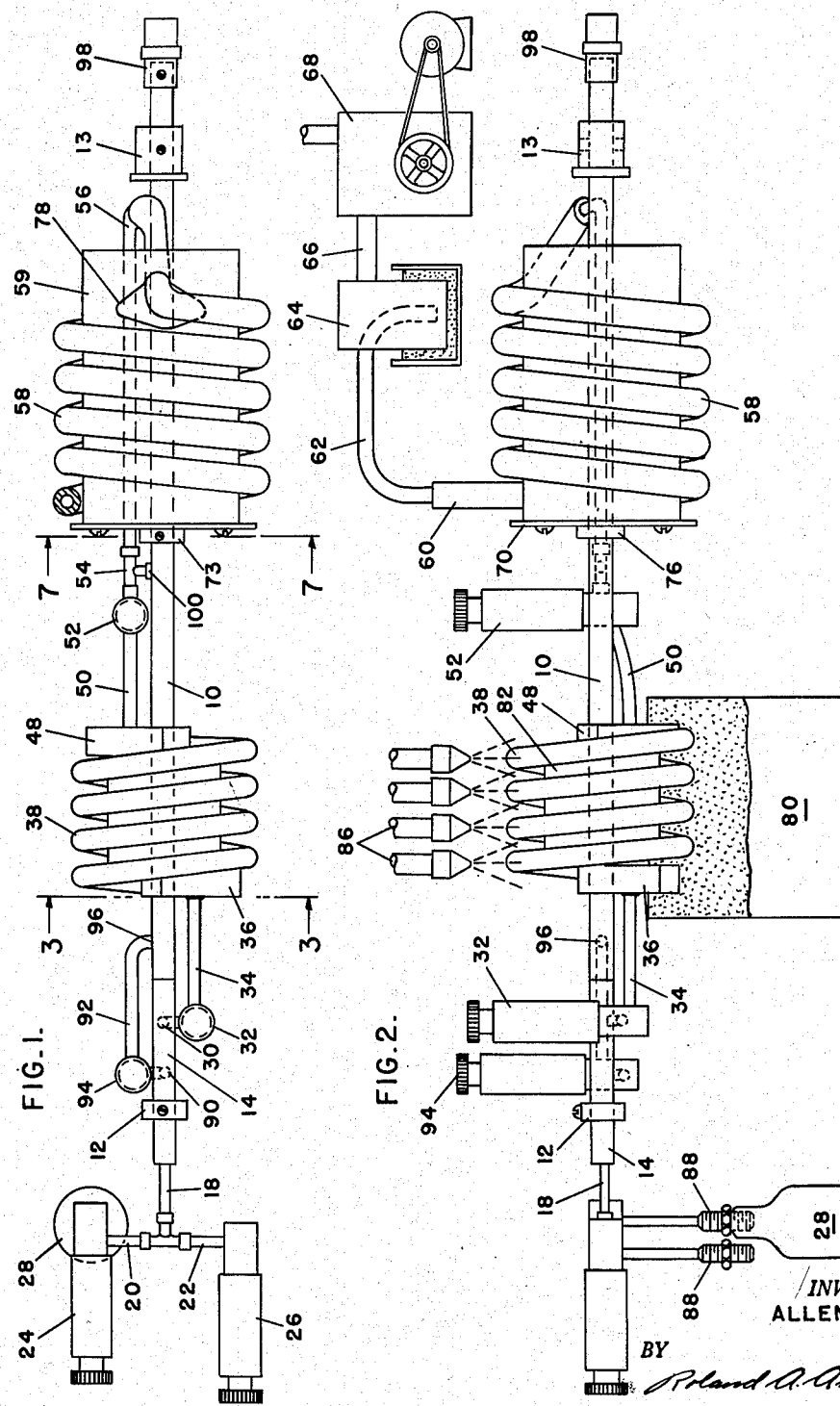

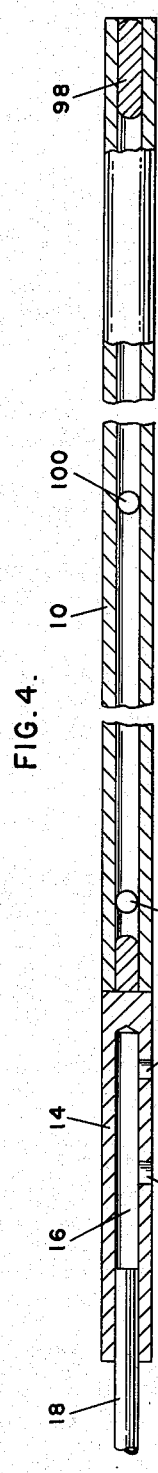
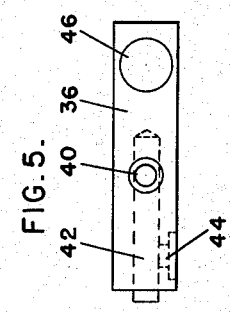
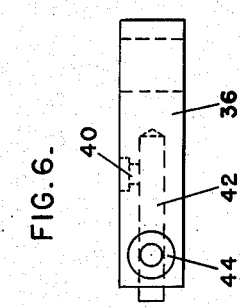
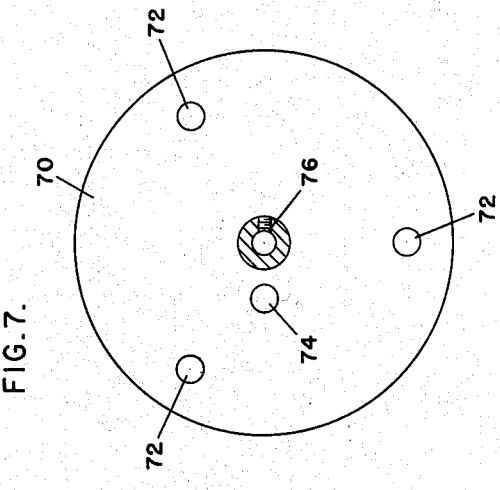
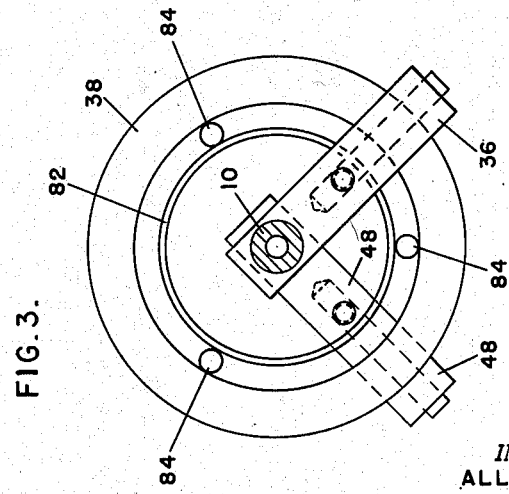

2,628,892

UNITED STATES PATENT OFFICE 2,628,892

APPARATUS FOR FRACTIONAL SUBLIMATION

Allen Francis Reid, Dallas, Tex., assignor to the United States of America as represented by the United States Atomic Energy Commission Application January 19, 1950, Serial No. 139,417

5 Claims. (Cl. 23—264)

This invention relates to an apparatus for increasing the concentration of one component in a mixture of difficultly separable components, at least one of which passes from the solid phase into the vapor phase without becoming a liquid.

This application is a continuation-in-part of my co-pending application Serial Number 595,191, filed May 21, 1945, now abandoned.

Most of the methods generally used on an industrial scale for separating the components of a mixture depend upon some form of liquid-phase separation, such as fractional distillation, fractional crystallization, selective extraction and centrifugation. However, none of these methods can be used efficiently in separating the components of a solid which normally pass directly from the solid to the gaseous phase and which can not be liquefied at economically practicable temperatures and pressures. The same considerations apply when it is desired to effect a separation between a solid and a relatively small quantity of a liquid and the vapor pressures of the solid and the liquid have values that are nearly the same.

Accordingly, it is an object of this invention to provide apparatus for separating difficultly separable materials, at least one of which passes directly from the solid phase into the vapor phase.

It is another object of the invention to separate the components of a volatile solid without the use of a liquid-phase process or of a chemical reaction and to accomplish this object in an essentially simple and wholly practical manner.

A more specific object of the invention is to separate the components of a volatile solid by progressive fractional sublimation.

Another object of the invention is to provide apparatus for the progressive sublimation of a volatile solid.

A particular object of the invention is to separate the components of a volatile solid mixture by a process effectively involving countercurrent flow of a solid and its vapors.

Still other objects of the invention will be readily inferrable from the description following or will be set forth therein.

Generally speaking, the present apparatus is useful in carrying out methods of separation that involve the alternate condensation and vaporization in alternate heated and cooled zones of a vaporizable mixture having a non-fluid condensed phase, that is, a condensed phase that is either a solid or a solid-liquid mixture containing so little liquid that the mixture does not flow under ordinary circumstances. One portion of the material vaporized in each heated zone is caused to flow back, countercurrently to the condensed phase, as vapor reflux and be at least partially condensed in the next preceding cooled zone whereas the remainder of the vaporized condensed phase is caused to flow forwardly to the next cooled zone and be at least partially condensed therein. In the operation of the process, the mixture to be separated, in both condensed and vaporized states, is in motion relative to the series of alternate hot and cold zones.

One theory of the operation of such processes is presented below with the understanding that this invention is not limited to any particular theory and that this discussion is presented only to assist in the understanding of the manner in which the invention operates. The mixture to be separated is admitted to an extended passage which is alternately heated and cooled along its length in hot and cold zones which may be moved relative to the passage (or the passage moved relative to the hot and cold zones). At least a portion of the mixture condenses to a solid in the first cold zone, and any remainder in other cold zones in the series. The alternate hot and cold zones are then moved relative to the condensed mixture toward the point where the mixture was admitted. Hence, the body of the condensed mixture gradually leaves a cold zone and advances at the same time into an adjacent hot zone where it is progressively vaporized, that is, sublimed. The vapor initially formed by this process is enriched with respect to one of the components of the mixture because of the difference in the vaporization rates of the components. Since the vapor pressure in the cold zone will be relatively low compared to that in the hot zone, a portion of the vapor formed from the condensed phase will flow back toward the moving cold zone and be recondensed. This provides what may be termed a "vapor reflux." The remainder of the vapor formed in this hot zone flows towards the next succeeding cold zone where it too is condensed. This flow also takes place because of a difference in the pressures between the hot and cold zones. Because the components of the mixture have different rates of vaporization, diffusion and/or condensation, the mixture condensing in the second cold zone is enriched in one component relative to the mixture remaining in the first cold zone. It should be emphasized that there is a zone of relatively high pressure corresponding to each hot zone between a pair of cold zones so that portions of the vapor formed in the hot zone tend to flow both forward and backward through the passage. It is probable that the separation is achieved primarily because of differences in the rates of vaporization and condensation and of diffusion among the components of the mixture being separated.

It will be evident that a countercurrent flow of solid and its vapor is achieved in this process. The advantages of such a process are manifest since many mixtures (including liquid mixtures, as illustrated hereafter) formerly considered to be not readily separable in any simple manner may now be easily separated by the present process.

Apparatus capable of carrying out the above-described method and embodying the present invention is shown in the accompanying drawings and will be described in detail hereinbelow. In general, it comprises a helical passage which is rotatable about its axis together with means for establishing in each operative turn of the helix a hot zone for vaporizing the mixture to be separated and a cold zone for condensing the vaporized material. Means are also provided for rotating the helix so that condensed material may be mechanically moved relative to the hot and cold zones. While the invention will be described with reference to particular examples of the method and to a particular embodiment of the apparatus it is to be understood that the detailed description is not intended as a limitation on the invention. In the description reference will be made to the accompanying drawings in which:

Figure 1 is a plan view, largely diagrammatic in character, showing an apparatus embodying the principles of the invention.

Figure 2 is an elevational view of the apparatus shown in Figure 1.

Figure 3 is a sectional view taken on the line 3—3 of Figure 1 and it shows the manner in which the helix is supplied and in which it is mounted on a rotatable shaft.

Figure 4 is a view of the shaft corresponding to the position of the shaft in Figure 2 and parts are in section to show the interior construction of the shaft.

Figure 5 is a plan view of an arm used in supplying material to the helix and in securing it to the shaft.

Figure 6 is an elevational view of the arm shown in Figure 5.

Figure 7 is an end view taken on the line 7—7 of Figure 1 and shows a wheel or disk which is mounted on the rotatable shaft and which forms a part of a flexible connection between rotatable and non-rotatable portions of the apparatus.

With reference now to the numerals in the drawings, numeral 10 indicates a tubular rotatable shaft supported by the bearings 12 and 13 and adapted to be rotated therein by any suitable driving mechanism (not shown), e. g., a gear drive, a chain-and-sprocket or belt-and-pulley drive. Fixed to one end of the shaft 10 is a fitting 14 that is in effect an extension of the shaft 10. The fitting 14, as shown in Figure 4, has an internal axial bore 16 extending through most of its length from the free end of the fitting, but not communicating with the interior of the tubular shaft 10. At the open end of the fitting 14 a tube 18 extends into the bore 16 and makes a gas-tight connection therewith. The tube 18 in turn communicates with a T-fitting whose arms 20 and 22 are provided with valves, designated 24 and 26 respectively. The valves 24 and 26 are used to control the flow of vaporized mixture from the raw material containers 28, only one of which is shown, the containers being attached by means of the fittings 88 in communication with the valve ports. Thus the flow of material from the containers 28 passes through valve 24 or 26, which controls the flow, through the tube 18 into the fitting 14. Gas flows from the fitting 14 through an opening 30 in the bottom of the fitting, through a cut-off valve 32 and a tube 34 into a supply arm 36 mounted on the shaft 10 for supplying raw material to the helical tube 38.

As illustrated best in Figures 5 and 6, the arm 36 has an opening 40 in which the end of the tube 36 is sealed. The opening 40 communicates with an axial passage 42 leading to a second opening 44 offset by 90° from the opening 40 and communicating with one end of the helical tube 38. The shaft 10 engages the arm 36 through a hole 46 through one end of the arm. It will be seen that a continuous passage is provided between the sample containers 28 and the helical tube 38, the passage including the fitting 14, tube 34 and the passage 42 in arm 36.

The helical tube 38 is coiled around the shaft 10 as an axis and is effectively mounted thereon by means of the arm 34 and a second similar arm 48 so that it rotates with the shaft. The second arm 48 engages the helical tube and the shaft 10 at the end of the helical tube opposite the arm 36. The helical tube 38 therefore communicates through the arm 48, which has openings and an internal passage similar to the arm 36, with a tube 50 containing a valve 52. The tube 50 in turn communicates through the arms of a T-fitting 54, whose purpose will be described presently, and through a tube 56 with a length of flexible tubing 58 that is wound about the surface of a hollow cylinder 59 which is mounted on the shaft 10. The tube 56 extends through the cylinder 59 and is sealed into the end of the flexible tubing 58 beyond the end of the cylinder. The end 60 of the flexible tubing 58 remote from the point where it joins the tube 56 is connected through tube 62 with a refrigerated trap 64 for condensibles and through the trap and the tube 66 with a vacuum pump 68. Conventional apparatus may be used for both the trap 64 and the vacuum pump 68. It will be noted at this point that a continuous passage is provided between the helical tube 38 and the vacuum pump 68 through the arm 48, the tubes 50 and 56, the flexible tubing 58 and the refrigerated trap. The flexible tubing 58 is employed to provide a flexible connection between the rigid coil 38 rotatable with the shaft and the vacuum pump and trap which are not so rotatable.

The cylinder 59, on which the flexible tubing 58 is wound, may be mounted on the shaft 10 for rotation therewith by any suitable means. As shown in the drawings, the end of the cylinder 59 nearest the helical coil 38 is covered by a wheel or disk 70 having screw holes 72 therethrough (see Figure 7) and a hole 74 for the tube 56. The disk 70 is also provided with a hub 76 by means of which it is mounted on the shaft 10 with set screws. The other end of the cylinder 59 is preferably left open so that the flexible tube 58 may be passed from its point of connection with tube 56 through the cylinder and out through an opening 78 cut in the surface of the cylinder. A sealed revolvable connection between the trap which collects the products obtained from the helical coil 38 and the coil itself is therefore provided by this combination of cylinder and flexible tubing. In the operation of the device the flexible tubing is wound and unwound from the cylinder as the shaft is rotated. Other satisfactory connections could be employed under the proper circumstances, for example, a bellows seal or ground glass joints properly mounted. It will be noted that all of the apparatus that has been described hereinbefore with the exception of the refrigerated trap and the vacuum pump is carried by the shaft and all but the flexible tubing, trap and pump rotate with the shaft.

A passage is provided through the interior of the tubular shaft for by-passing the helical coil 38. This passage begins at a second opening 90 in the fitting 14. This opening communicates through a tube 92 containing a valve 94 with an opening 96 leading to the interior of the tubular shaft 10 which is sealed by a cap or plug 98 at the end remote from the fitting 14. The interior of the shaft 10 communicates with the flexible tube 58 through the T-fitting 54 which is sealed into an opening 100 in the tubular shaft and thence through the tube 56. The valves 32 and 52, upstream and downstream of the helical tube 38 respectively, may be closed, thus effectively isolating the helical tube. This by-pass may be used to evacuate any atmospheric air which may be admitted to the system while the containers 28 are being secured to the fittings 88. During this operation all of the valves may be closed but a certain amount of air, for example, will enter the containers and/or fittings 88 and the tubes connecting the fittings to the valves 24 and 26. In order to evacuate these contaminants the valves 32 and 52 are kept closed while the valve 94 is opened to open the by-pass through the tube 92, the interior of the tubular shaft, the T 54, the tube 56, and the flexible connector. The vacuum is then applied to the end of the flexible tube 58 by the vacuum pump 68 and the contaminants are exhausted. After the contaminants have been removed, the valve 94 is closed and the valves 32 and 52 opened and the separation process may be carried out as will be presently described in detail.

As shown in Figure 2, the bottom of the helical coil 38 is refrigerated to a temperature at which one or both of the components to be separated are solid by means of a suitable refrigerant contained in a vessel 80, the vessel being diagrammatically illustrated. The upper part of the coil opposite the refrigerated portion is heated to a temperature at which the components to be separated are vaporized. This may be done by any suitable means such as the hot-gas nozzles 86 used to blow a heated gas over the coil. Direct heat from a gas flame has also been used but is difficult to control. For many applications an electric radiant heater is to be preferred. Mounted within the coil 38 and generally coaxial therewith is a cylindrical heat shield 82. The heat shield 82 is secured to and spaced from the coil 38 by means of the spacers 84 which may be satisfactorily soldered to the coil and to the shield (see Figure 3).

With respect to the materials of construction the apparatus may be fabricated of any material that can be used to make the connections and that will withstand the conditions of operation and the corrosive properties of the mixture to be separated. Copper valves and tubing with a helical coil of nickel tubing have been used when handling corrosive fluorides.

The operation of the apparatus is as follows: A container 28 filled with the mixture whose components are to be separated is kept in a refrigerated condition to maintain the mixture in the condensed state. The container is attached to one of the fittings 88 mounted on one of the valves 24 or 26 with the valve closed. After the container has been sealed on the fitting and contaminant gases exhausted as described, the temperature of the container is raised to a value at which its contents are volatile. The valve to which the container is attached is then opened and the vapors of the mixture flow from the container through the various tubes and fittings and the arm 36 into the helical tube 38. The rate of flow of the gases into the helical coil is adjusted with reference to the number of turns in the coil so that a portion of the mixture condenses in each refrigerated portion of the coil and so that the entire quantity of the mixture is condensed within the confines of the coil. The entire apparatus is then rotated slowly by rotating the shaft 10, a rate of one R. P. M. or thereabouts being satisfactory in most applications. As the coil rotates (in the diagram, in a counterclockwise direction when viewed from the valve 52) the more volatile component of the mixture moves toward the discharge end of the coil to a greater extent than does the less volatile component. That is, the movement of the more volatile component is in the direction of the flexible connector. In this way a separation of the components or an enrichment of the product with respect to one of the components is effected.

In order to present a more detailed explanation of the operation of the apparatus the theory advanced hereinbefore will be resorted to. However, it will be understood that this explanation merely represents my present understanding of the theory of its operations and that it is not intended to limit the invention to any particular theory of its operation. With the helix rotating slowly, the portions of the helical coil containing the condensed mixture leave the refrigerant and advance toward a hot zone. This motion of the coil mechanically transports the condensed phase toward the warmer zone to vaporize it. This advanced material is vaporized when it reaches the warmer zone, the composition of the vapor depending upon the relative rates of vaporization of the components of the mixture. Because the pressure in the hot zone of any turn of the helix is higher than in either the cold zone of the same turn or of the next succeeding cold zone in the following turn (by reason of the vapor pressure of the vaporized mixture), a portion of this vaporized mixture will flow backward into the cold zone from which it originated and another portion of the vaporized material will flow forward into the next succeeding cold zone. This bi-directional flow of vapor may be diffusive or mass flow in nature or some combination of these. The vapor flowing in these two directions by reason of the difference in pressure between the hot and the cold zones is condensed when it reaches the corresponding cold zones. Here the relative rates of condensation of the components and probably their relative rates of diffusion from the hot zone will determine the relative concentration of the material condensing. In view of this bi-directional flow of vapor it will be evident that something approaching a countercurrent process is achieved with a portion of the vapor flowing countercurrently to the condensed phase. This backward flow of vapors is what has been characterized as a "vapor reflux."

This process may be considered to continue from turn to turn of the helical tube. In the first turn of the helix the condensed phase may be said to be subjected to a progressive sublimation as it is withdrawn from the refrigerated zone and carried into the heated zone. Incidentally, it is preferable that the hot and cold zones be as nearly contiguous as possible in order to prevent mechanical transfer of the condensed phase to a succeeding cold zone. As the material in the form of vapor flows from turn to turn of the helix it is subjected to repeated progressive sublimations in the manner described and as a result the material leaving the product end of the helix is relatively rich in the more volatile component. An analogy might be drawn between the present method and the operation of a rectifying column, there being a succession of vapor-containing zones and zones containing the condensed phase. In contrast to rectification, however, in the present case, reflux is provided by a flow of vapor rather than by a flow of condensed phase.

Before starting a separation run the entire system should be evacuated to eliminate so far as is possible gases which do not take part in the separation. Also, the system should be tested for leaks prior to its use. However, the requirements are not so stringent as in high vacuum processes, and it is generally sufficiently gas-tight if the apparatus can be evacuated to a pressure of less than 1 micron.

A striking example of the utility of this invention is in the separation of perfluoro-n-heptane ($C_7F_{16}$) from uranium hexafluoride. A mixture of these compounds is formed in certain processes which need not be detailed here and these mixtures generally contain upwards of 90% $UF_6$ contaminated by upwards of 7% $C_7F_{16}$. It is desired to separate the $C_7F_{16}$ and thus to purify the $UF_6$. While the $C_7F_{16}$ is a liquid and the $UF_6$ a solid at temperatures and pressures of the order of atmospheric temperature and pressure, the actual concentration of the $C_7F_{16}$ in this mixture is so small that the mixture itself appears to be a solid and is not "wet" in a visual or tactile sense. It is therefore not feasible to separate the liquid from the solid by filtration. Also the $C_7F_{16}$ which is the contaminant is extremely stable chemically, far more so than the $UF_6$. Chemical means are therefore not practical when it is desired to obtain the $UF_6$.

Moreover, the vapor pressure curves of these two materials are very similar and cross each other at a temperature between 0° C. and 10° C., or in other words, at a particular temperature between 0° and 10° C. the vapor pressures of the two components of the mixtures are identical. At higher temperatures the $UF_6$ is the more volatile component while at lower temperatures $C_7F_{16}$ is more volatile. Accordingly, because of this similarity in the vapor pressures it is not practicable to separate the liquid from the solid by a conventional drying process. Again, it has been found undesirable to so alter the conditions of separation as to make possible a completely liquid-phase separation, e. g., distillation. A separation of these components to yield $UF_6$ containing no detectable concentration of $C_7F_{16}$ has been achieved by this invention using the apparatus shown. In carrying out this separation a rotational speed of one R. P. M. was used with a refrigerant tempertures in the range −10° C. to −40° C. and a hot gas temperature less than 400° C.

While the particular mixture described contains a liquid component, the process is equally successful in separating two or more solids which pass directly into the vapor phase.

Thus, in addition to the separation effected between $UF_6$ and $C_7F_{16}$, the present invention has also been used to concentrate mixtures of benzene and cyclohexane with respect to one of the components. As is well known, these two compounds can be separated only with great difficulty in the liquid state since their boiling points are about 1° C. apart and their vapor pressure curves are virtually identical. For example, at 20° C. the vapor pressure of benzene is about 74.9 millimeters of mercury while that of cyclohexane at the same temperature is 76.9 millimeters of mercury. The solid compounds at 0° C. have vapor pressures of 24.6 millimeters for benzene and 27.8 for cyclohexane. However, at a temperature of −30° C. the solid compounds have vapor pressures of 2.194 millimeters for benzene and 3.652 millimeters for cyclohexane. At this temperature the difference is sufficiently marked to make feasible an easy separation by means of the present invention. The following table is indicative of the degree of separation which may be obtained between these two compounds using the present method and apparatus. The speed of rotation in all runs was 0.7 to 0.8 R. P. M.

*Table I*

| Run No. | Composition of Mixt. Percent $C_6H_6$ | Refrigerant Temp., °C. | Hot Zone Temp., °C. | Volatile Prod. Percent $C_6H_6$ | Bottoms Percent $C_6H_6$ |
|---|---|---|---|---|---|
| 1 | 58.0 | −50 | 30–50 | 98.0 | 53.0 |
| 2 | 58.0 | −51 | 20–35 | 73.5 | 49.8 |
| 3 | 58.0 | −49 | 25–60 | 94.5 | 52.5 |
| 4 | 58.0 | −50 | 25–50 | 85.5 | -------- |
| 5 | 58.0 | −50 | 35–50 | 95.0 | 52.6 |
| 6 | 58.0 | −50 | 30–45 | 99.0 | 47.0 |
| 7 | 58.0 | −52 | 25–40 | 99.1 | 46.4 |
| 8 | 58.0 | −49 | 25–40 | 96.1 | 51.0 |
| 9 | 25.6 | −61 | 45–55 | 99.0 | 70.8 |
| 10 | 58.0 | −58.5 | 40–60 | 99.0 | 54.0 |

The advantage gained by using this method and apparatus in effecting a separation of the type described resides in the fact that the separation may be carried out at temperatures where the relative vapor pressures of the components of the mixture are markedly different. As indicated above, there is little difference between the vapor pressures of benzene and cyclohexane even at temperatures as low as 0° C. However, at the temperatures employed in the foregoing example it will be noted that the vapor pressures of the solids differ by as much as 50% or more. Thus this invention may be used to separate easily the components of a mixture which is normally liquid and normally very difficult to separate in the liquid phase. This principle has been applied with some success to the concentration of the isotope oxygen-18 using water and to the concentration of carbon-14 using a mixture of enriched and normal mesitylene, $C_6H_3(CH_3)_3$. Other mixtures containing or consisting of the isotopic species of an element may similarly be concentrated.

Thus this invention is applicable not only in cases where no liquid phase may be practicably obtained but also in cases where the separation factor over a practical distillation range is very small but the separation factor between gas and solid is appreciable. Similarly, mixtures which require that a low temperature be used in handling them may be easily fractionated without the need of relatively expensive high vacuum equipment. This invention will also find use in cases where the holdup in conventional rectifying columns would be too large to make such columns feasible for the purpose, e. g., the separation of a small fraction of a mixture.

In carrying out the process using the apparatus shown in the drawings, a limited number of revolutions is usually sufficient to produce a very satisfactory separation. However, this will depend upon the temperatures employed and also upon the materials being separated.

Basically, the separation achieved in this process is effected primarily because of the relative thermodynamic properties of the components of the mixture. For example, the separation is affected by the difference in the rates of heat transfer between the components of the mixture themselves and between the components and the heating and cooling means as well as the relative latent heats of the compounds of the mixture, and their relative rates of condensation and vaporization. It is thought also that the rates of diffusion of the molecules between the hot, high-pressure and cold, low-pressure zones also affects the separation.

The temperature employed on the hot side of the coil is generally dictated by the properties of the materials being separated as well as by the materials of construction. Hence, it is desirable that for each separation they be determined empirically. The pressure within the apparatus is determined primarily by the temperature in the cold zone of the tube and is generally close to the vapor pressure of the condensed phase at that temperature. The rate of rotation depends not only on the relative concentrations of the components of the mixture but also on the number of turns in the coil and on the desired degree of purity of product.

In addition to the separation of $UF_6$ from $C_7F_{16}$ the process may also be used to separate $UF_6$ from perfluoro-dimethyl-cyclohexane ($C_8F_{16}$) or from hydrogen fluoride (HF). Similarly, either $C_7F_{16}$ or $C_8F_{16}$ may be separated from hydrogen fluoride by this method. Many other alternatives in the process variables and in the elements of the apparatus will be apparent to those skilled in the art as will be many other applications of this invention.

Since many embodiments might be made of the present invention and since many changes might be made in the embodiment described, it is to be understood that the foregoing description is to be interpreted as illustrative only and not in a limiting sense.

I claim:

1. In apparatus for separating the components of a difficultly separable, vaporizable mixture, in combination, a tube wound in the form of a helix and rotatable about the axis of said helix, means for introducing said mixture into said tube, means longitudinally disposed to the axis of said helix for establishing in corresponding portions of each operative turn of said tube a zone of relatively low temperature adapted to condense said mixture, separate means longitudinally disposed with respect to the axis of said helix for establishing in each said operative turn of said tube a zone of relatively high temperature adapted to vaporize said mixture, said condensing and vaporizing means being spaced circumferentially about said helix and extending longitudinally thereof, and means for rotating said tube.

2. In apparatus for separating the components of a difficultly separable, vaporizable mixture, in combination, a tube in the form of a helix adapted to be rotated about the axis of said helix, means for introducing said mixture into said tube, heating means longitudinally disposed with respect to the axis of said helix and adapted to heat corresponding portions of each operative turn of said tube to a vaporization temperature of said mixture, separate refrigerating means longitudinally disposed to the axis of said helix and adapted to cool corresponding portions of each said operative turn of said tube to the condensing temperature of said mixture, said heating and refrigerating means extending longitudinally of said helix and being spaced circumferentially thereabout, and means for rotating said tube.

3. Apparatus according to claim 2 in which both the heating means and the refrigerating means are positioned outside the helix and in which a heat-reflecting member is mounted within the helix and is adapted to reflect heat from the heating means to the inner surfaces of the corresponding portions of the operative turns of the tube.

4. In apparatus for separating the components of a difficultly separable, vaporizable mixture, in combination, a tube in the form of a helix rotatable about the axis of the helix, means for introducing said mixture into said tube, heating means longitudinally disposed with respect to the axis of said helix, said heating means being adapted to heat corresponding portions of each operative turn of said tube to a vaporizing temperature of said mixture, separate refrigerating means longitudinally disposed with respect to the axis of said helix and including a cooling medium in contact with corresponding portions of each said operative turn of said tube adapted to cool said mixture to its condensing temperature, said heating and refrigerating means being spaced circumferentially about said helix and extending longitudinally thereof, and means for rotating said tube.

5. In apparatus for separating the components of a difficultly separable, vaporizable mixture, in combination, a tube in the form of a helix having a horizontal axis and being rotatable thereabout, means for introducing said mixture into said tube, a heater positioned above said tube and adapted to heat the upper portion of each turn of said tube to a vaporizing temperature of said mixture, said heater being longitudinally disposed with respect to the axis of said helix, a separate refrigerator positioned below said tube and including a refrigerant in which the lower portion of each turn of said tube is immersed, said refrigerant being adapted to cool said mixture to its condensing temperature, said refrigerator being longitudinally disposed with respect to the axis of said helix, said heater and refrigerator being spaced circumferentially about said helix and extending longitudinally thereof, a cylindrical heat-reflecting member mounted axially within said helix to reflect heat from said heater to the inner surfaces of each said turn of said tube, and means for rotating said tube.

ALLEN FRANCIS REID.

REFERENCES CITED

The following references are of record in the file of this patent:

UNITED STATES PATENTS

| Number | Name | Date |
|---|---|---|
| 1,589,373 | De Remer | June 22, 1926 |

FOREIGN PATENTS

| Number | Country | Date |
|---|---|---|
| 5,315 | Great Britain | June 27, 1826 |
| 87,654 | Switzerland | Jan. 3, 1921 |